United States Patent
Ji

(10) Patent No.: US 11,086,541 B2
(45) Date of Patent: Aug. 10, 2021

(54) MEMORY SYSTEM, MEMORY CONTROLLER, AND OPERATING METHOD

(71) Applicant: SK hynix Inc., Gyeonggi-do (KR)

(72) Inventor: SeungGu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/796,588

(22) Filed: Feb. 20, 2020

(65) Prior Publication Data

US 2021/0042031 A1 Feb. 11, 2021

(30) Foreign Application Priority Data

Aug. 7, 2019 (KR) .................. 10-2019-0096028

(51) Int. Cl.
*G06F 3/06* (2006.01)
*G06F 1/30* (2006.01)

(52) U.S. Cl.
CPC ............. *G06F 3/064* (2013.01); *G06F 1/30* (2013.01); *G06F 3/0617* (2013.01); *G06F 3/0653* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2012/0047409 | A1* | 2/2012 | Post | G11C 29/82 714/718 |
| 2013/0073789 | A1* | 3/2013 | Khmelnitsky | G06F 3/0685 711/103 |
| 2015/0043277 | A1* | 2/2015 | Fitzpatrick | G06F 3/064 365/185.11 |
| 2016/0364155 | A1* | 12/2016 | Fitzpatrick | G06F 3/0679 |
| 2017/0286286 | A1* | 10/2017 | Szubbocsev | G06F 3/0688 |
| 2018/0081588 | A1* | 3/2018 | Lee | G06F 3/061 |
| 2019/0324670 | A1* | 10/2019 | Lee | G06F 3/0659 |
| 2019/0369908 | A1* | 12/2019 | Koo | G06F 3/0659 |

FOREIGN PATENT DOCUMENTS

| | | |
|---|---|---|
| KR | 10-2017-0107886 | 9/2017 |
| KR | 10-2018-0052465 | 5/2018 |

* cited by examiner

*Primary Examiner* — Kevin Verbrugge
(74) *Attorney, Agent, or Firm* — IP & T Group LLP

(57) ABSTRACT

Embodiments of the present disclosure relate to a memory system, a memory controller, and an operating method. A command from a host is received and multiple streams corresponding to the command are generated, and the size of super memory blocks is dynamically configured according to the number of multiple streams. Accordingly, the number of currently accessed memory dies can be adjusted according to the number of streams, and the cost for preventing data loss when SPO occurs can be minimized.

16 Claims, 13 Drawing Sheets

MEMORY SYSTEM, MEMORY CONTROLLER, AND OPERATING METHOD

CROSS REFERENCE TO RELATED APPLICATION

The present application claims priority under 35 U.S.C. 119(a) to Korean patent application number 10-2019-0096028 filed in the Korean intellectual property office on Aug. 7, 2019, which is incorporated herein by reference in its entirety.

BACKGROUND OF THE INVENTION

1. Field of the Invention

Embodiments of the present disclosure relate to a memory system, a memory controller, and an operating method.

2. Description of the Prior Art

A memory system which corresponds to a storage device is a device configured to store data on the basis of a request of a host such as a computer, a mobile terminal (for example, a smartphone or a tablet), or various other electronic devices. The memory system may include not only a device configured to store data in a magnetic disk such as hard disk drive (HDD), but also a device configured to store data in a nonvolatile memory such as a solid state drive (SSD), a universal flash storage device (UFS), or an embedded MMC (eMMC) device.

The memory system may further include a memory controller for controlling the memory device. The memory controller may receive a command from a host and, on the basis of the received command, may execute or control operations for reading, writing, or erasing data with regard to a volatile memory or a nonvolatile memory in the memory system. The memory controller may drive firmware for performing a logical operation for executing or controlling such operations.

Meanwhile, there is ongoing research regarding a technology for improving the write performance when a memory system writes data on the basis of a command from a host. The memory system needs not only to write data as fast as possible, but is also to prevent data loss if sudden power off (SPO) occurs while writing data.

SUMMARY OF THE INVENTION

Embodiments of the present disclosure provide a memory system, a memory controller, and an operating method wherein the number of currently accessed memory dies can be adjusted according to the number of streams.

In addition, embodiments of the present disclosure provide a memory system, a memory controller, and an operating method wherein the cost necessary to prevent data loss when SPO occurs can be minimized.

In an aspect, embodiments of the present disclosure may provide a memory system including: a memory device including multiple memory blocks and including multiple memory dies including a part of the multiple memory blocks; and a memory controller configured to control the memory device.

The memory controller may receive a command from a host and generate multiple streams corresponding to the command.

The memory controller may dynamically configure the size of super memory blocks according to the number of multiple streams, each of the super memory blocks which corresponds to one of the multiple streams, and includes at least one of the multiple memory blocks.

In this regard, the memory controller may dynamically configure the size of super memory blocks corresponding to the multiple streams, respectively, according to the number of multiple streams.

The memory controller may control such that the number of multiple streams is less than or equal to a threshold stream number.

The memory controller may control such that the size of each of the super memory blocks corresponding to the multiple streams decreases as the number of multiple streams increases.

The memory controller may control such that the size of a super memory block corresponding to a first stream among the multiple streams is greater than or equal to than the size of a super memory block corresponding to a second stream, which is generated after the first stream among the multiple streams.

The memory system may further include a power supply device configured to supply emergency power to the memory controller when sudden power off (SPO) occurs. The power supply device may include a capacitor configured to accumulate an electric charge in order to supply the emergency power.

The memory controller may control such that the total sum of the size of each of the super memory blocks is less than or equal to a threshold size determined on the basis of a charging capacity of the capacitor.

In another aspect, embodiments of the present disclosure may provide a memory controller including: a memory interface configured to communicate with a memory device including multiple memory blocks and including multiple memory dies including a part of the multiple memory blocks; and a control circuit configured to control the memory device.

The control circuit may receive a command from a host and generate multiple streams corresponding to the command.

The control circuit may dynamically configure the size of super memory blocks according to the number of multiple streams, each of the super memory blocks which corresponds to one of the multiple streams, and includes at least one of the multiple memory blocks.

In this regard, the control circuit may dynamically configure the size of super memory blocks corresponding to the multiple streams, respectively, according to the number of multiple streams.

The control circuit may control such that the number of multiple streams is less than or equal to a threshold stream number.

The control circuit may control such that the size of each of the super memory blocks corresponding to the multiple streams decreases as the number of multiple streams increases.

The control circuit may control such that the size of a super memory block corresponding to a first stream among the multiple streams is greater than or equal to the size of a super memory block corresponding to a second stream, which is generated after the first stream among the multiple streams.

The memory controller may receive emergency power supplied from a power supply device when SPO occurs. The power supply device may include a capacitor configured to accumulate an electric charge in order to supply the emergency power.

The control circuit may control such that the total sum of the size of each of the super memory blocks is less than or equal to a threshold size determined on the basis of a charging capacity of the capacitor.

In another aspect, embodiments of the present disclosure may provide a method for operating a memory controller configured to control a memory device.

The method for operating the memory controller may include a step of generating multiple streams corresponding to a command from a host.

The method for operating the memory controller may include a step of dynamically configuring the size of super memory blocks according to the number of multiple streams, each of the super memory blocks corresponding to one of the multiple streams.

The memory device may include multiple memory blocks and may include multiple memory dies including a part of the multiple memory blocks.

The super memory blocks may include at least one of the multiple memory blocks.

In another aspect, embodiments of the present disclosure may provide a memory system including a memory device and a controller.

The memory device may include a plurality of dies, each of the plurality of dies including multiple blocks.

The memory controller coupled to the plurality of dies may receive a command from a host.

The memory controller may generate multiple streams corresponding to the command.

The memory controller may configure super memory blocks based on the number of multiple streams, each of the super memory blocks corresponding to one of the multiple streams and including blocks selected from among the plurality of dies.

The number of the selected blocks in each of the super memory blocks and the number of the plurality of dies including the selected blocks decrease as the number of the multiple streams increases.

According to embodiments of the present disclosure, the number of currently accessed memory dies can be adjusted according to the number of streams.

In addition, according to embodiments of the present disclosure, the cost necessary to prevent data loss when SPO occurs can be minimized.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in detail with reference to the accompanying drawings.

Figure 1:
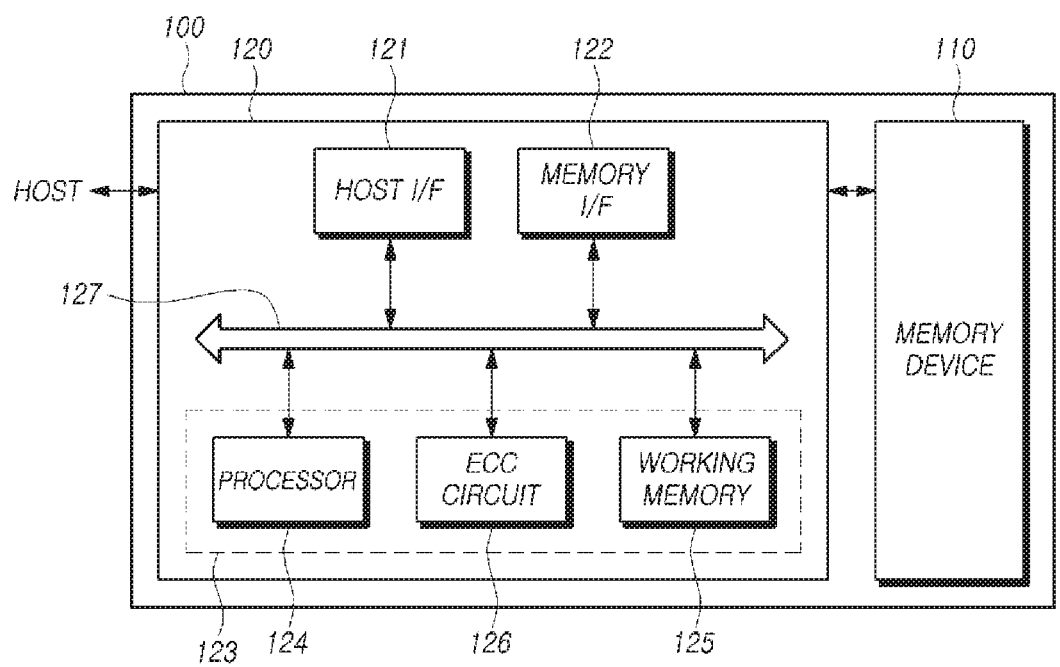
FIG. 1 is a diagram illustrating a memory system according to embodiments of the present disclosure.

FIG. 1 is a diagram illustrating a memory system 100 according to embodiments of the present disclosure.

Referring to FIG. 1, the memory system 100 may include a memory device 110 configured to store data, and a memory controller 120 configured to control the memory device 110.

The memory device 110 includes multiple memory blocks, and is configured to operate in response to a control of the memory controller 120. Operations of the memory device 110 may include, for example, a read operation, a program operation (also referred to as a "write operation"), and an erase operation.

The memory device 110 may include a memory cell array including multiple memory cells (also simply referred to as "cells") configured to store data. The memory cell array may be included in a memory block.

For example, the memory device 110 may be implemented in various types, such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a three-dimensional (3D) NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a charge trap flash (CTF) having an electric charge storage layer configured as an insulating film.

The memory device 110 is configured to receive a command and an address from the memory controller 120 and to access an area of the memory cell array, which is selected by the address. That is, the memory device 110 may perform an operation corresponding to the command with regard to the area selected by the address.

For example, the memory device 110 may perform a program operation, a read operation and an erase operation. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may include, for example, at least one among garbage collection (GC), wear leveling (WL), and bad block management (BBM) operations.

The memory controller 120 may control the operation of the memory device 110 at the request of a host HOST. Alternatively, the memory controller 120 may control the operation of the memory device 110 regardless of the request of the host HOST.

The memory controller 120 and the host HOST may be separate devices. In some cases, the memory controller 120 and the host HOST may be integrated and implemented as a single device. It will be assumed in the following, for convenience, that the memory controller 120 and the host HOST are separate devices.

The memory controller 120 may include a host interface (I/F) 121, a memory interface 122 and a control circuit 123.

The host interface 121 is configured to provide an interface for communication with the host HOST.

When receiving a command from the host HOST, the control circuit 123 may receive the command through the host interface 121 and may perform an operation of processing the received command.

The memory interface 122 is connected to the memory device 110 so as to provide an interface for communication with the memory device 110. That is, the memory interface 122 may be configured to provide the memory device 110 and the memory controller 120 with an interface in response to a control of the control circuit 123.

The control circuit 123 is configured to control the operation of the memory device 110 by performing operations for overall control of the memory controller 120. To this end, for example, the control circuit 123 may include at least one among a processor 124 and a working memory 125, and may further include, in some cases, an error detection/correction circuit (ECC circuit) 126.

The processor 124 may control the overall operation of the memory controller 120, and may perform a logical operation. The processor 124 may communicate with the host HOST through the host interface 121, and may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the same into the PBA by using a mapping table.

There are various address mapping methods by the FTL, according to the mapping unit. Typical address mapping methods include a page mapping method, a block mapping method, and a hybrid mapping method.

The processor 124 is configured to randomize data received from the host HOST. For example, the processor 124 may randomize data received from the host HOST by using a randomizing seed. The randomized data is provided to the memory device 110 as data to be stored, and is programmed in the memory cell array of the memory device 110.

The processor 124 is configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) so as to control the operation of the memory controller 120. In other words, the processor 124 may control the overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include at least one among a flash translation layer (FTL), a host interface layer (HIL) and a flash interface layer (FIL). The flash translation layer (FTL) is configured to translate between a logical address that the host HOST requests the memory system 100 to provide and a physical address of the memory device 110. The host interface layer (HIL) is configured to interpret a command that the host HOST issues to the memory system 100 (or storage device) and to deliver the same to the FTL. The flash interface layer (FIL) is configured to deliver a command issued by the FTL to the memory device 110.

The firmware may be stored in the memory device 110, for example, and then loaded into the working memory 125.

The working memory 125 may store firmware, program codes, commands, or pieces of data necessary to drive the memory controller 120. The working memory 125 may include, for example, at least one among a static RAM (SRAM), a dynamic RAM (DRAM) and a synchronous RAM (SDRAM), as a volatile memory.

The error detection/correction circuit 126 may be configured to detect an error bit of check target data by using an error correction code, and to correct the detected error bit. For example, the check target data may be data stored in the working memory 125, or data retrieved from the memory device 110.

The error detection/correction circuit 126 may be implemented to decode data by using the error correction code. The error detection/correction circuit 126 may be implemented by using various decoders. For example, various decoders include a decoder that performs decoding using a non-systematic code or a decoder that performs decoding using a systematic code.

For example, the error detection/correction circuit 126 may detect an error bit, sector by sector, with regard to each piece of read data. That is, each piece of read data may include multiple sectors. As used herein, a sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is greater than a reference value, the error detection/correction circuit 126 may determine that the corresponding sector is uncorrectable or fails. If the BER is less than the reference value, the error detection/correction circuit 126 may determine that the corresponding sector is correctable or passes.

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only examples. Some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In some cases, one or more other constituent elements may be added, in addition to the above-mentioned constituent elements of the memory controller 120.

Hereinafter, the memory device 110 will be described in more detail with reference to FIG. 2.

Figure 2:
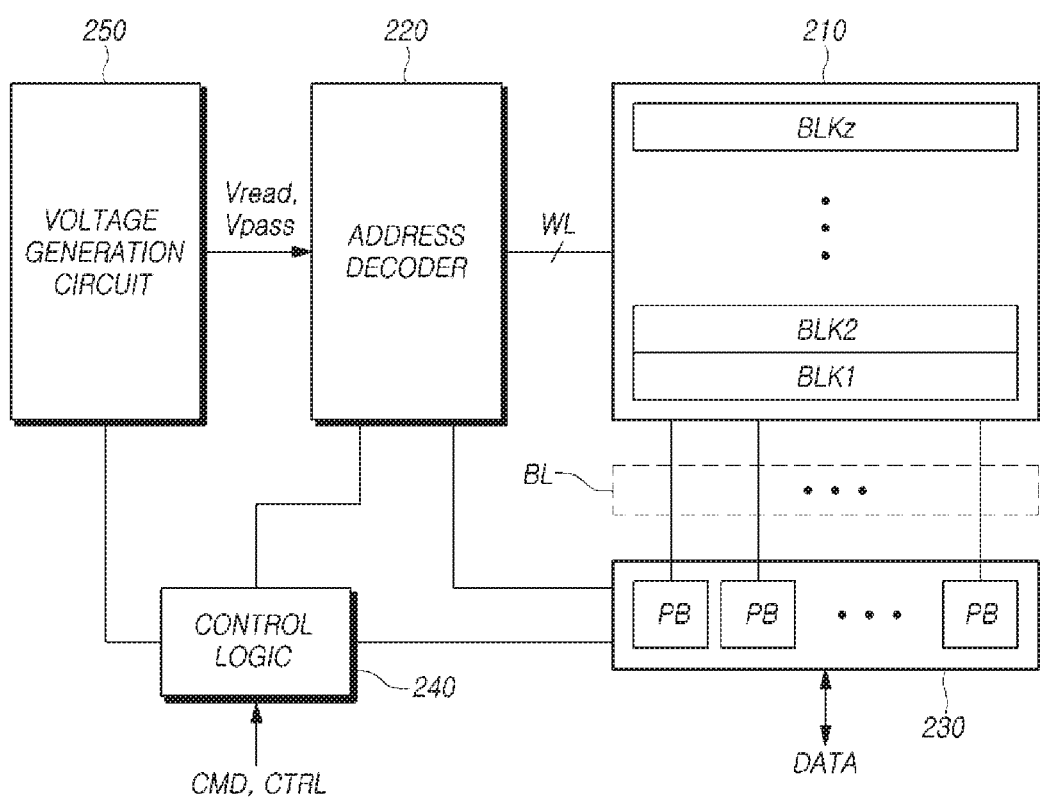
FIG. 2 is a block diagram illustrating a memory device according to embodiments of the present disclosure.

FIG. 2 is a block diagram illustrating a memory device 110 according to embodiments of the present disclosure.

Referring to FIG. 2, the memory device 110 may include a memory cell array 210, an address decoder 220, a read and write (read/write) circuit 230, a control logic 240 and a voltage generation circuit 250.

The memory cell array 210 may include multiple memory blocks BLK1 to BLKz (where z is a natural number greater than or equal to 2).

In the multiple memory blocks BLK1 to BLKz, multiple word lines WL and multiple bit lines BL may be disposed, and multiple memory cells MC may be arranged.

The multiple memory blocks BLK1 to BLKz may be connected to the address decoder 220 through the multiple word lines WL. The multiple memory blocks BLK1 to BLKz may be connected to the read/write circuit 230 through the multiple bit lines BL.

Each of the multiple memory blocks BLK1 to BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data. As another example, each of the multiple memory cells in the memory cell array 210 may be a multi-level cell (MLC) configured to store two bits of data. As another example, each of the multiple memory cells in the memory cell array 210 may be a triple-level cell (TLC) configured to store three bits of data. As another example, each of the multiple memory cells in the memory cell array 210 may be a quad-level cell (QLC) configured to store four bits of data. As another example, the memory cell array 210 may include multiple memory cells, each of which is configured to store at least five bits of data.

The address decoder 220, the read/write circuit 230, the control logic 240 and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block, when the read voltage is applied, and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one among a block address, a row address, and a column address.

The address decoder 220 may select one memory block and one word line according to the block address and the row address. The column address may be decoded by the address decoder 220 and provided to the read/write circuit 230.

The address decoder 220 may include at least one among a block decoder, a row decoder, a column decoder and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that is in charge of a data processing function and, in some cases, may further include a cache buffer in charge of a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230 and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
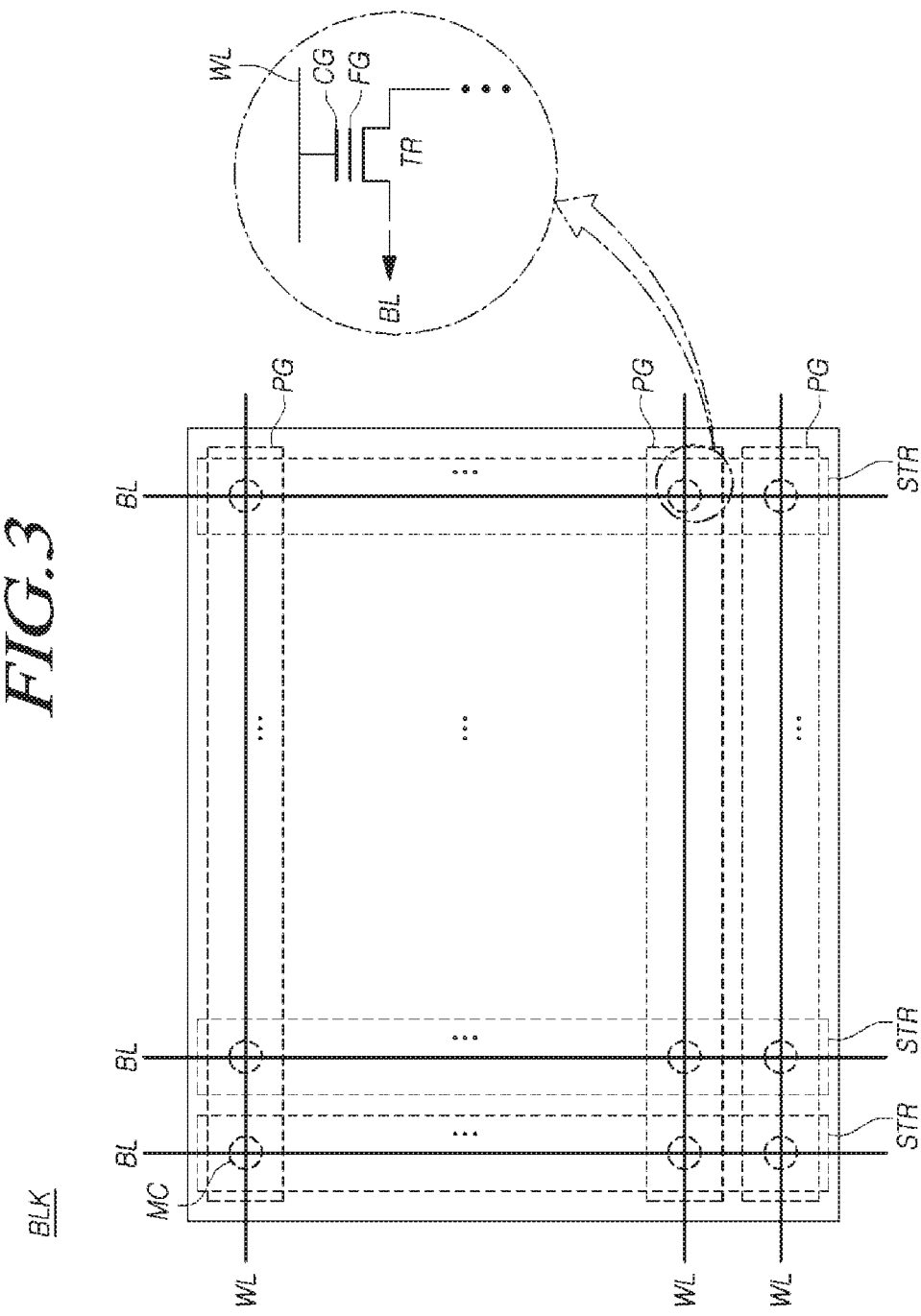
FIG. 3 is a diagram illustrating each memory block of a memory device according to embodiments of the present disclosure.

FIG. 3 is a diagram illustrating each memory block BLK of a memory device 110 according to embodiments of the present disclosure.

Referring to FIG. 3, the memory block BLK may be arranged and configured in such direction that multiple pages PG and multiple strings STR Intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1 to BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (or write operation) may be performed page by page, and an erase operation may be performed memory block by memory block.

Figure 4:
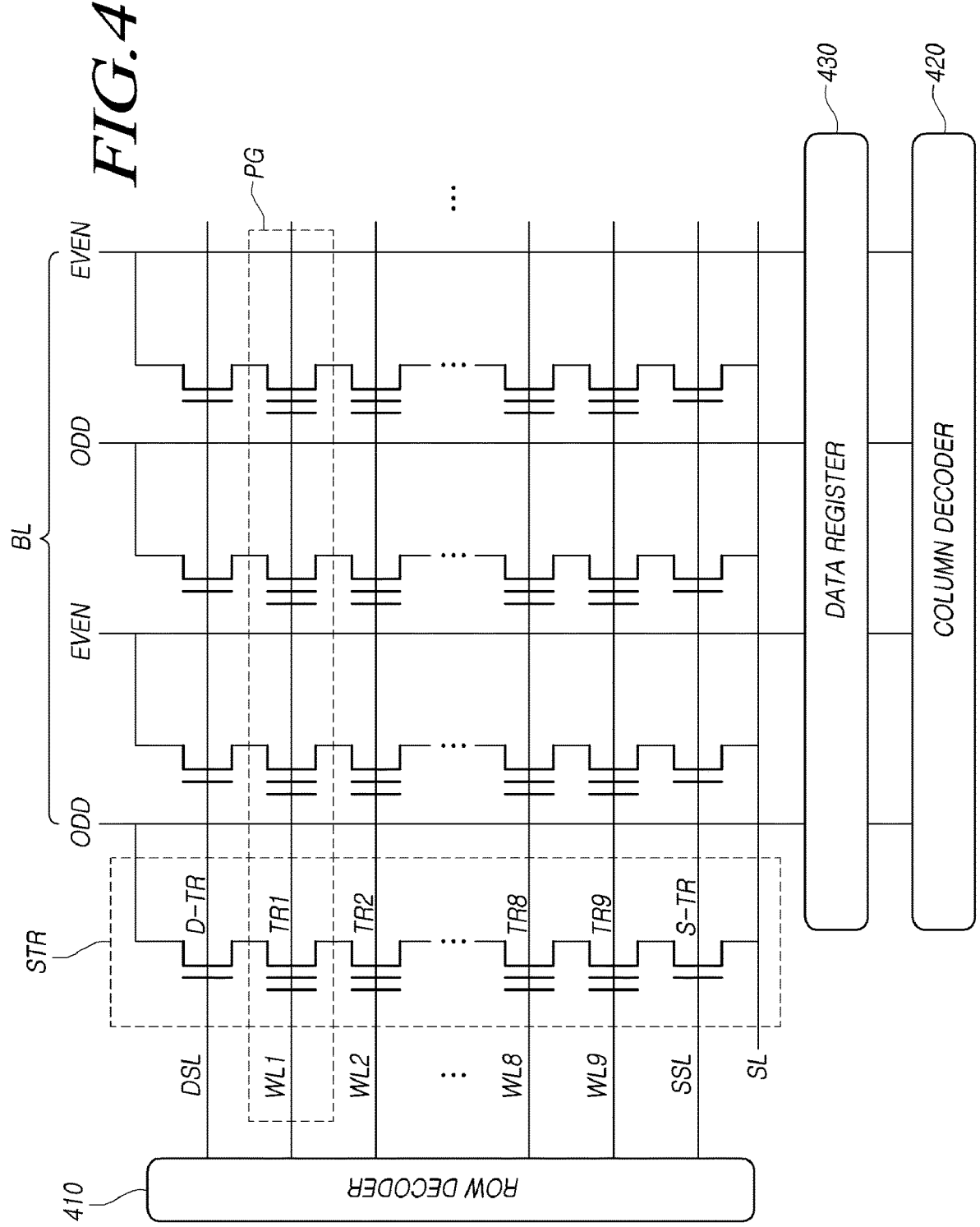
FIG. 4 is a diagram illustrating the structure of word lines and bit lines of a memory device according to embodiments of the present disclosure.

FIG. 4 is a diagram illustrating the structure of word lines WL and bit lines BL of a memory device 110 according to embodiments of the present disclosure.

Referring to FIG. 4, the memory device 110 has a core area in which memory cells MC are concentrated, and an auxiliary area which corresponds to the remaining area of the core area, and which supports operations of the memory cell array 210.

The core area may include pages PG and strings STR. In the core area, multiple word lines WL1 to WL9 and multiple bit lines BL are arranged to intersect.

The multiple word lines WL1 to WL9 may be connected to a row decoder 410, and the multiple bit lines BL may be connected to a column decoder 420. A data register 430, which corresponds to a read/write circuit 230, may exist between the multiple bit lines BL and the column decoder 420.

The multiple word lines WL1 to WL9 correspond to multiple pages PG.

For example, each of the multiple word lines WL1 to WL9 may corresponds to one page PG as illustrated in FIG. 4. In contrast, when each of the multiple word lines WL1 to WL9 has a large size, each of the multiple word lines WL1 to WL9 may correspond to at least two (for example, two or four) pages PG. Each page PG is the smallest unit in connection with conducting a program operation and a read operation, and all memory cells MC within the same page PG may perform simultaneous operations when conducting the program operation and the read operation.

The multiple bit lines BL may be connected to the column decoder 420 while being distinguished between odd-numbered bit lines BL and even-numbered bit lines BL.

In order to access a memory cell MC, the address may enter the core area first through the input/output end and then through the row decoder 410 and the column decoder 420 such that the target memory cell can be designated. As used herein, designating a target memory cell refers to accessing one of memory cells MC at the sites of intersection between the word lines WL1 to WL9 connected to the row decoder 410 and the bit lines BL connected to the column decoder 420, in order to program data therein or to read programmed data therefrom.

Pages PG in a first direction (for example, X-axis direction) are connected by a commonly used line referred to as a word line WL. Strings STR in a second direction (for example, Y-axis direction) are connected by a common line referred to as a bit line BL. As used herein, being commonly bound refers to being structurally connected by the same material and simultaneously receiving the same voltage during voltage application. Obviously, the voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 430 plays an essential role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

Referring to the example Illustrated in FIG. 4, in one string STR, multiple transistors TR1 to TR9 connected to multiple word lines WL1 to WL9 may exist. The areas in which the multiple transistor TR1 to TR9 exist correspond to memory cells MC. As used herein, the multiple transistors TR1 to TR9 refer to transistors including control gates CG and floating gates FG.

The multiple word lines WL1 to WL9 include two outermost word lines WL1 and WL9. A first selection line DSL may be additionally arranged outside the first outermost word line WL1, which is closer to the data register 430 in terms of the signal path among the two outermost word lines WL1 and WL9. A second selection line SSL may be additionally arranged outside the other second outermost word line WL9.

The first selection transistor D-TR, which is controlled to turn on or turn off by the first selection line DL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver or block signals.

The memory system 100 needs to fill the target memory cell MC of the bit line BL to be programmed with electrons during a program operation. Accordingly, the memory system 100 applies a predetermined turn-on voltage $V_{CC}$ to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, thereby may be a time difference in on/off timing between the first selection transistor D-TR and the second selection transistor S-TR.

The memory system 100 may supply a predetermined voltage (for example, +20V) to the substrate through a source line SL during an erase operation. The memory system 100 floats both the first selection transistor D-TR and the second selection transistor S-TR during an erase operation, thereby generating an Infinite resistance. The resulting structuration removes the role of the first selection transistor D-TR and that of the second selection transistor S-TR, and allows electrons to operate only between the floating gate FG and the substrate due to the potential difference.

Figure 5:
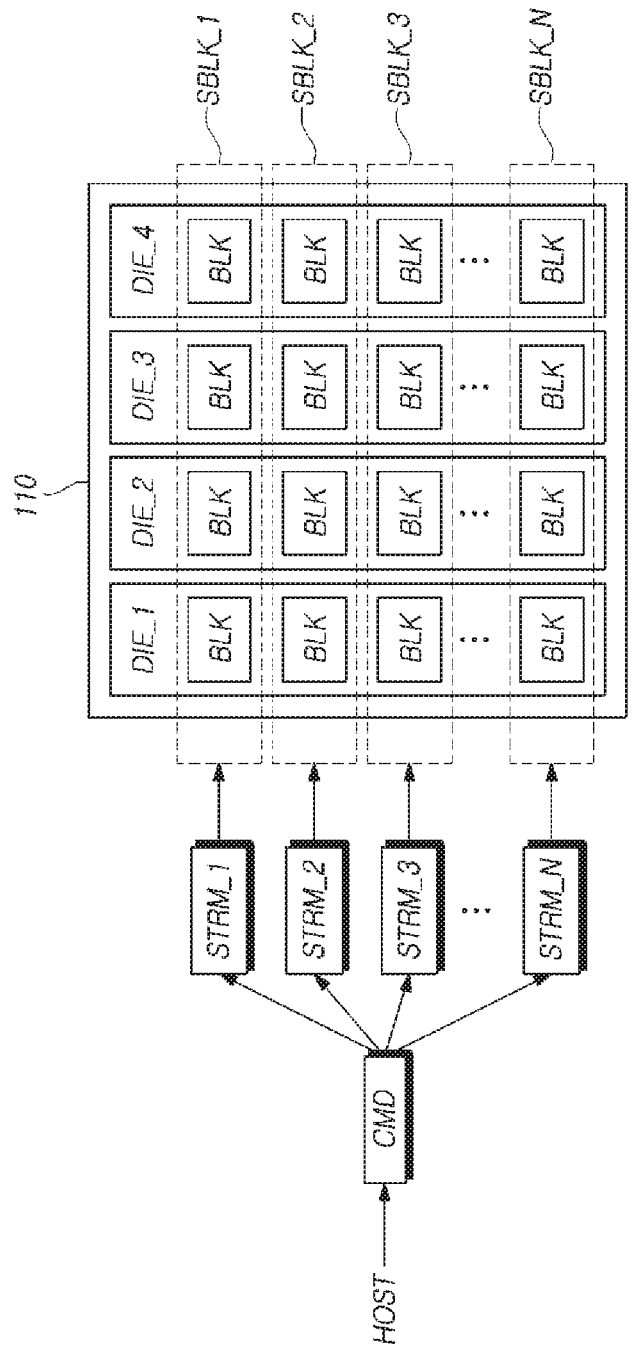
FIG. 5 is a diagram illustrating an operation of processing a command from a host in a memory system according to embodiments of the present disclosure.

FIG. 5 is a diagram illustrating an operation of processing a command from a host HOST in a memory system 100 according to embodiments of the present disclosure.

Referring to FIG. 5, the memory controller 120 of the memory system 100 may process a command CMD from the host HOST by generating multiple streams STRM_1 to STRM_N.

The memory controller 120 may distinguish and manage the multiple streams STRM_1 to STRM_N. The memory controller 120 may process the multiple streams STRM_1 to STRM_N in a parallel manner.

The criterion used by the memory controller 120 to distinguish the multiple streams may be determined in various manners. For example, the memory controller 120 may distinguish a steam for processing data that is updated and accessed relatively frequently, and a stream for processing data that is updated and accessed relatively infrequently.

The memory controller 120 may store data of one of the multiple streams STRM_1 to STRM_N in a single super memory block including at least one of multiple memory blocks in the memory device 110. That is, the single super memory block may store only pieces of data in the same stream. If data in a stream is stored in the super memory block, the corresponding super memory block may be described as corresponding to the corresponding stream.

Memory blocks in a super memory block may be included in different memory dies, respectively. In FIG. 5, the super memory blocks SBLK_1 to SBLK_N may include a memory block BLK in a memory die DIE_1, a memory block BLK in a memory die DIE_2, a memory block BLK in a memory die DIE_3, and a memory block BLK in a memory die DIE_4, respectively. Since a read/write operation can be processed in a parallel manner with regard to memory blocks in different memory dies, memory blocks in super memory blocks are included in different memory dies, respectively.

Although it will be assumed that blocks in a single super memory block are included in different memory dies, respectively, some of memory blocks in a single super memory block may be included in the same memory die.

Figure 6:
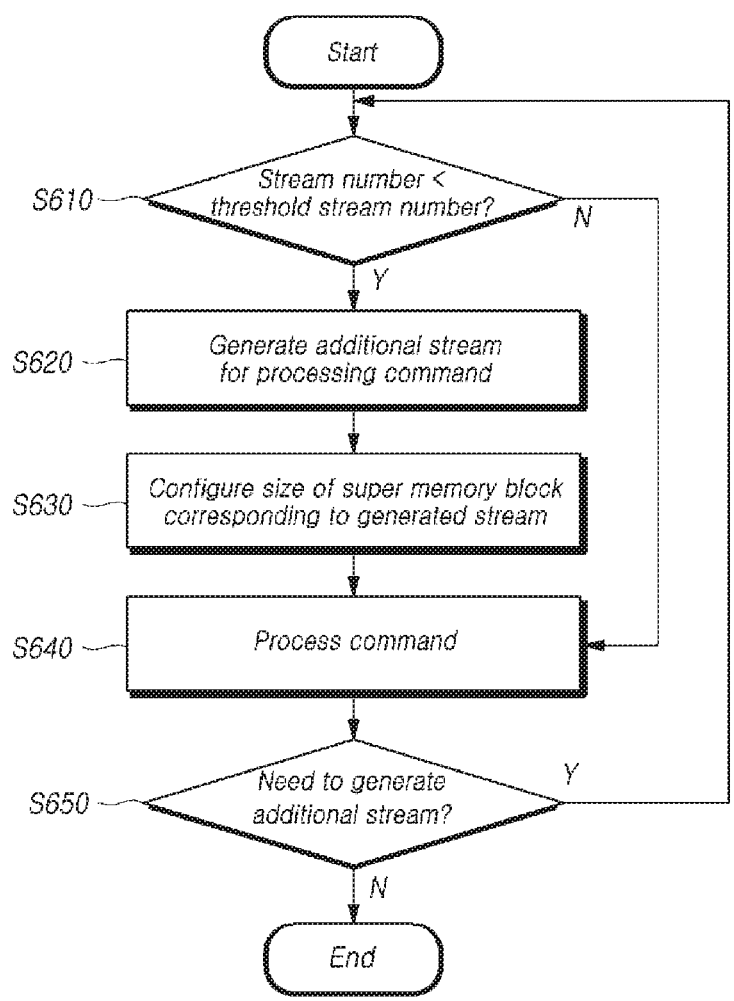
FIG. 6 is a flowchart illustrating an operation of processing a command in a memory system according to embodiments of the present disclosure.

FIG. 6 is a flowchart illustrating an operation of processing a command in a memory system 100 according to embodiments of the present disclosure.

It will be assumed in the following description that the memory controller 120 of the memory system 100 processes the command.

Referring to FIG. 6, the memory controller 120 first determines whether or not the number of currently generated streams is less than a threshold stream number (S610).

If the number of currently generated streams is less than the threshold stream number (Y in S610), the memory controller 120 may additionally generate a stream for processing the command (S620).

The memory controller 120 may determine the size of a super memory block corresponding to the stream generated in step S620 (S630). In other words, the memory controller 120 may configure a super memory block corresponding to the stream generated in step S620.

The memory controller 120 processes the command using the currently generated streams (S640).

If the number of currently generated streams is greater than or equal to the threshold stream number (N in S610), the memory controller 120 processes the command using the currently generated streams without generating an additional stream (S640).

That is, the memory controller 120 may control such that the number of streams for processing the command becomes less than or equal to the threshold stream number.

After step S640, the memory controller 120 determines whether or not an additional stream needs to be generated to process the command (S650).

If an additional stream needs to be generated (Y in S650), the memory controller 120 returns to step S610 and determines whether or not the number of currently generated streams is less than the threshold stream number. If no additional stream needs to be generated (N in S650), the memory controller 120 may end the command processing.

As described above, when multiple streams for processing the command are generated, the memory controller 120 may configure the size of super memory blocks which correspond to the multiple streams, respectively, and which Include at least one of multiple memory blocks in the memory device 110.

The size of the super memory blocks may be determined in various manners.

For example, the size of a super memory block may be determined by the number of memory blocks in the corresponding super memory block.

As another example, the size of a super memory block may be determined by the number of memory dies including at least one of memory blocks in the corresponding super memory block. That is, the size of the super memory block may be determined based on the number of memory dies including memory blocks in the corresponding super memory block.

The memory controller 120 may configure a super memory block corresponding to each of multiple streams as a fixed number. Alternatively, the memory controller 120 may dynamically configure a super memory block corresponding to each of multiple streams according to a specific condition.

For example, the memory controller 120 may dynamically configure a super memory block corresponding to each of multiple streams according to the number of multiple streams.

Hereinafter, operations of generating streams and dynamically configuring a super memory block corresponding to each of generated steams according to the number of generated streams by the memory controller 120 will be described with reference to FIG. 7 to FIG. 9.

It will be assumed in the following description with reference to FIG. 7 to FIG. 9 that the memory controller 120 may generate a maximum of four streams, and the memory device 110 includes four memory dies. It will also be assumed that the size of a super memory block is determined by the number of memory dies including at least one of memory blocks in the corresponding super memory block.

Figure 7:
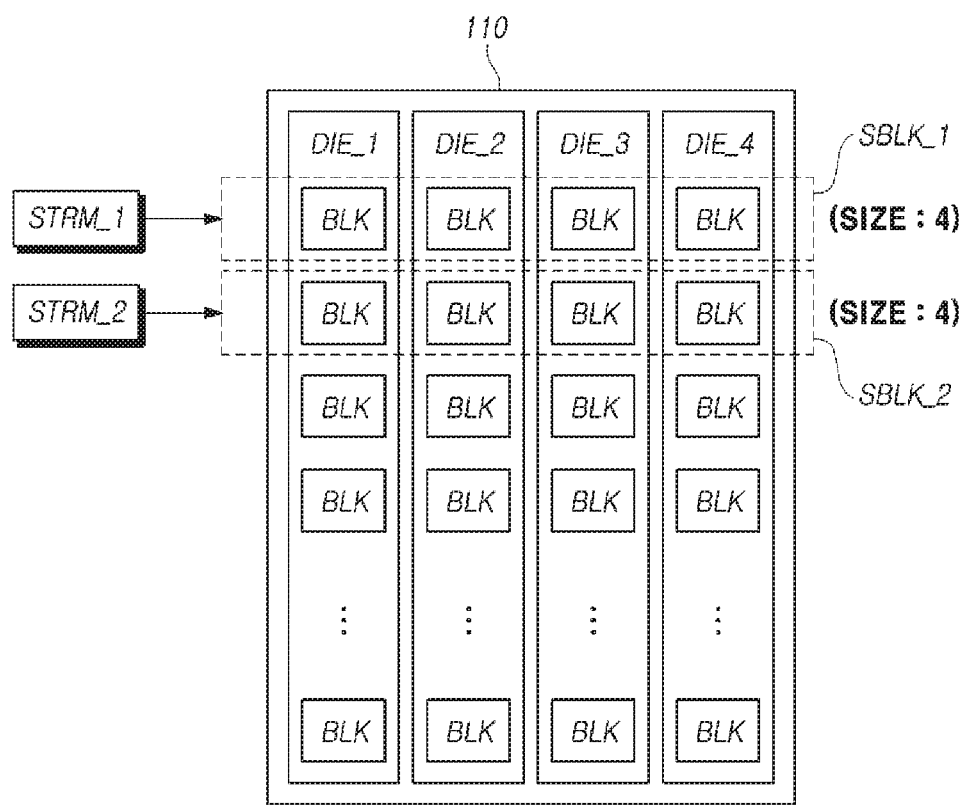
FIG. 7 is a diagram illustrating an operation of generating streams in a memory system according to embodiments of the present disclosure.

FIG. 7 is a diagram illustrating an operation of generating streams in a memory system 100 according to embodiments of the present disclosure.

Referring to FIG. 7, the memory controller 120 of the memory system 100 may generate two streams STRM_1 and STRM_2. The size of super memory block SBLK_1 corresponding to stream STRM_1 is 4, and size of super memory block SBLK_2 corresponding to the stream STRM_2 is 4.

The number of memory dies in the memory device 110 is 4, and the maximum value of the size of the super memory blocks SBLK_1 and SBLK_2 is 4. That is, the size of the super memory blocks SBLK_1 and SBLK_2 is configured to have the maximum value.

If the number of streams is less than or equal to a minimum reference stream number (for example, two), the memory controller 120 may configure each stream to have the maximum value.

Figure 8:
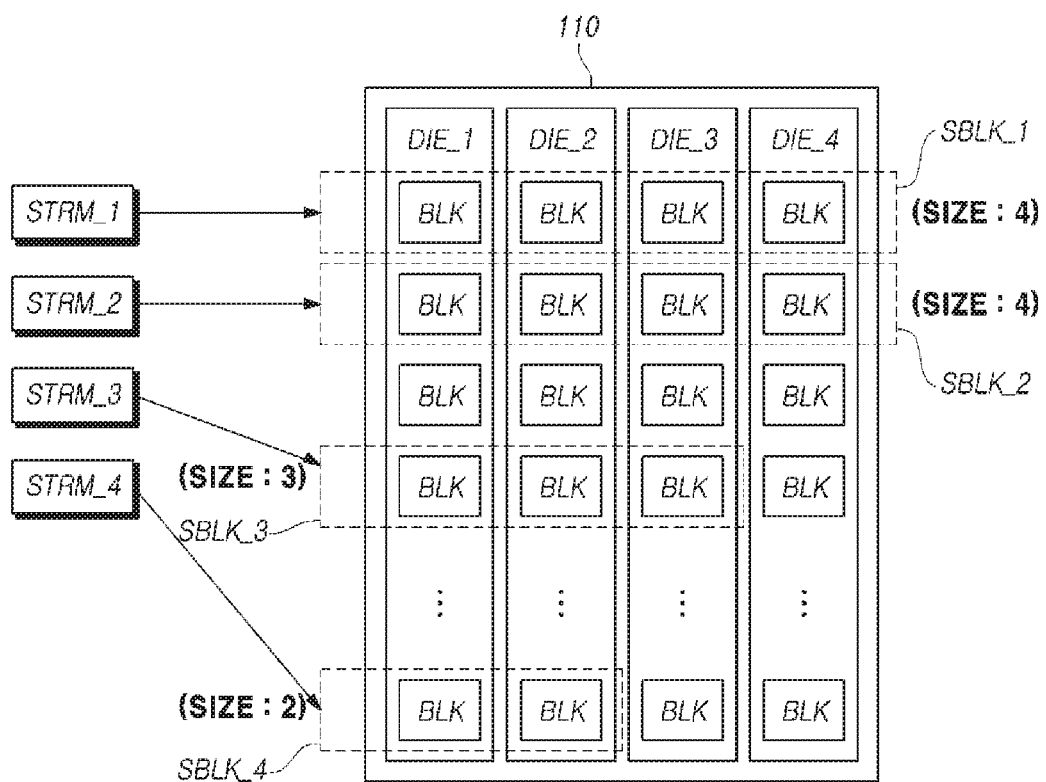
FIG. 8 is a diagram illustrating an operation of generating additional streams in FIG. 7.

FIG. 8 is a diagram illustrating an operation of generating an additional stream in FIG. 7.

Referring to FIG. 8, a stream STRM_3 is generated after streams STRM_1 and STRM_2 are generated and then a stream STRM_4 is generated. The size of a super memory block SBLK_3 corresponding to stream STRM_3 is 3, which is less than the size (4) of the super memory blocks SBLK_1 and SBLK_2 corresponding to the streams STRM_1 and STRM_2, respectively.

The size of a super memory block SBLK_4 corresponding to a stream STRM_4 is 2, which is less than the size (4) of the super memory blocks SBLK_1 and SBLK_2 corresponding to the streams STRM_1 and STRM_2, respectively, and the size (3) of the super memory block SBLK_3 corresponding to the stream STRM_3.

That is, the memory controller 120 may control such that the size of the super memory block corresponding to the first stream among multiple streams is greater than or equal to the size of the super memory block corresponding to the second stream generated after the first stream among the multiple streams.

Figure 9:
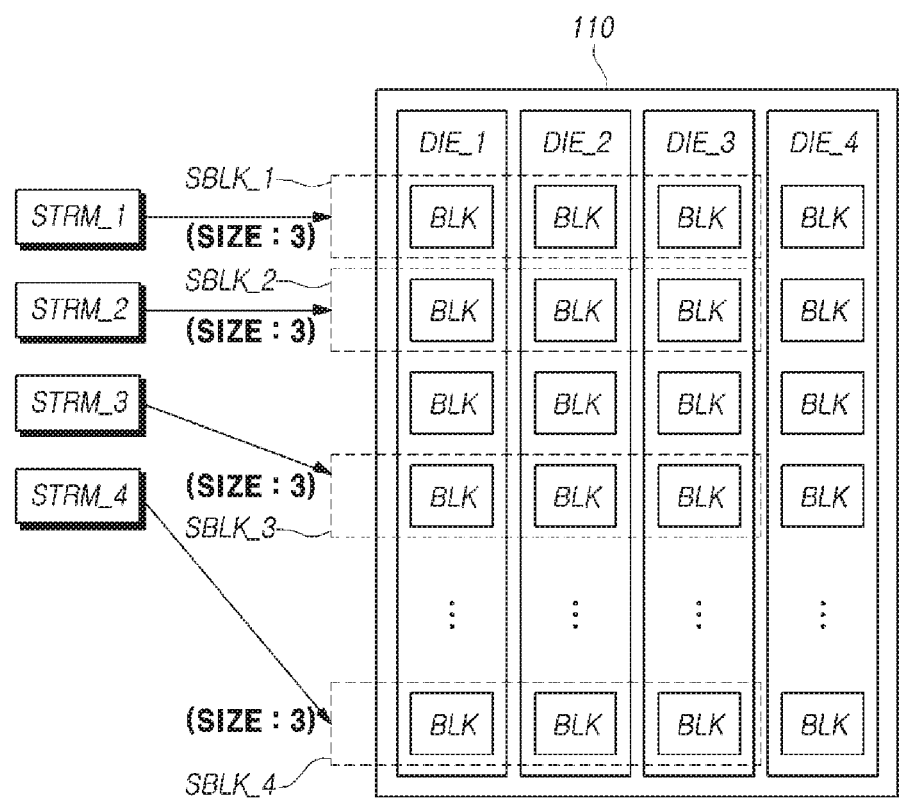
FIG. 9 is a diagram Illustrating another operation of generating additional streams in FIG. 7.

FIG. 9 is a diagram Illustrating another operation of generating an additional stream in FIG. 7.

Referring to FIG. 9, if streams STRM_3 and STRM_4 are generated after streams STRM_1 and STRM_2 are generated, the memory controller 120 may configure super memory blocks SBLK_1, SBLK_2, SBLK_3, and SBLK_4 corresponding to the streams STRM_1, STRM_2, STRM_3, and STRM_4, respectively, to include 3 memory blocks.

The size of the super memory blocks SBLK_1 and SBLK_2 corresponding to the streams STRM_1 and STRM_2, respectively, decreases from 4 to 3 as the number of streams increases from 2 to 4.

That is, the memory controller 120 may control such that the size of super memory blocks corresponding to multiple streams, respectively, decreases as the number of multiple streams increases.

The reason the memory controller 120 configures the size of super memory blocks corresponding to streams to be smaller as the number of streams increases, as mentioned above, is as follows.

As the number of streams increases, the number of super memory blocks that the memory controller 120 opens to process a command increases, and the total number of memory dies that the memory controller 120 accesses simultaneously also increases.

If sudden power off (SPO) occurs while the memory controller 120 simultaneously accesses multiple memory dies in order to process a command, the memory controller 120 needs to write data in the currently accessed memory die without errors. This is for the purpose of preventing data loss due to the SPO.

In order for the memory controller 120 to write data in the currently accessed memory die without errors when SPO occurs, emergency power needs to be supplied to the memory controller 120 and the memory device 110. The magnitude of the emergency power is proportional to the number of currently accessed memory dies.

Accordingly, a larger magnitude of emergency power is necessary in proportion to the number of currently accessed memory dies, and an increased cost is thus necessary for the memory system 100 to have a power supply device for supplying emergency power.

Therefore, in order to limit the number of memory dies that the memory controller 120 currently accesses even if the number of streams increases, the memory controller 120 may configure super memory blocks corresponding to the streams to be smaller as the number of streams increases. The magnitude of emergency power that the power supply device needs to supply decreases in this case, thereby making it possible to reduce the cost necessary for the memory system 100 to have a power supply device for supplying emergency power. Accordingly, the cost for preventing data loss when SPO occurs may be minimized.

The power supply device for supplying emergency power to the memory controller 120 during SPO will now be described.

Figure 10:
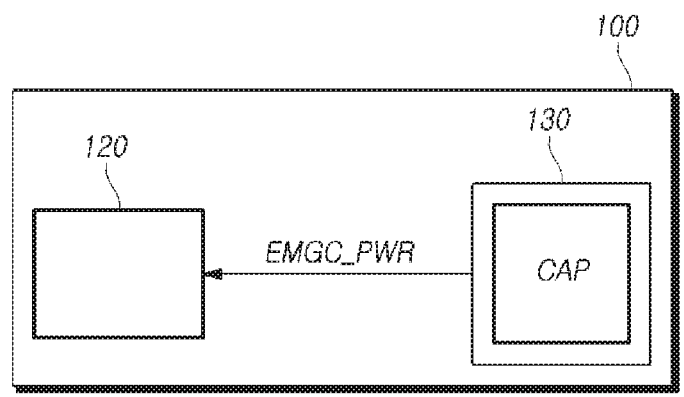
FIG. 10 is a diagram Illustrating a power supply device configured to supply charging power to a memory controller during sudden power off (SPO) in a memory system according to embodiments of the present disclosure.

FIG. 10 is a diagram illustrating a power supply device 130 configured to supply charging power to a memory controller 120 during sudden power off (SPO) in a memory system 100 according to embodiments of the present disclosure.

Referring to FIG. 10, the memory system 100 may include the power supply device 130 configured to supply emergency power EMGC_PWR to the memory controller 120 when SPO occurs.

The power supply device 130 may supply emergency power EMGC_PWR to the memory controller 120 through inner charging power. To this end, the power supply device 130 may include a capacitor CAP configured to accumulate an electric charge for supplying emergency power.

The capacitor may accumulate an electric charge through power supplied from outside the power supply device 130.

The capacitor may be an aluminum electrolytic capacitor or a polymer tantalum capacitor, but is not limited thereto.

Hereinafter, an example of configuring each of super memory blocks corresponding to multiple streams in the memory system 100 by the power supply device 130 will be described.

Figure 11:
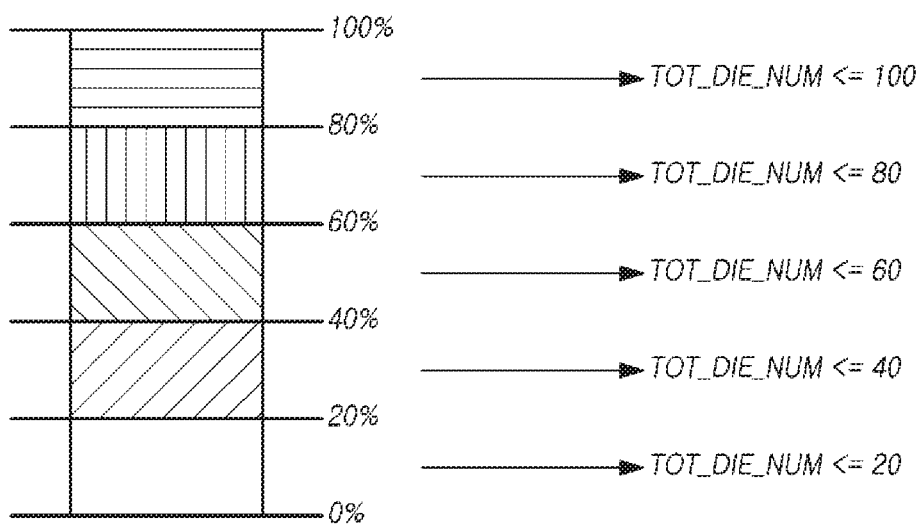
FIG. 11 is a diagram illustrating an operation of limiting the total sum of the size of super memory blocks corresponding to multiple streams, respectively, in a memory system according to embodiments of the present disclosure.

FIG. 11 is a diagram Illustrating an operation of limiting the total sum TOT_DIE_NUM of the size of each of super memory blocks corresponding to multiple streams in a memory system 100 according to embodiments of the present disclosure.

The memory controller 120 may control such that the total sum TOT_DIE_NUM of the size of each of super memory blocks corresponding to multiple streams is less than or equal to a threshold size. The threshold size may be determined on the basis of the charging capacity of the capacitor in the power supply device 130, that is, the amount of electric charge accumulated in the capacitor. Provided that the nominal or rated capacity (i.e., maximum voltage that can be input between the electrodes of the capacitor) is 100%, and that the discharged state corresponds to 0%, the charging capacity of the capacitor may be configured as a value ranging from 0% to 100%.

In FIG. 11, if the charging capacity of the capacitor is in a range of 0% to 20%, the memory controller 120 may control such that the total sum TOT_DIE_NUM of the size of the super memory blocks is less than or equal to the threshold size of 20.

If the charging capacity of the capacitor is in a range of 20% to 40%, the memory controller 120 may control such that the total sum TOT_DIE_NUM of the size of the super memory blocks is less than or equal to the threshold size of 40.

If the charging capacity of the capacitor is in a range of 40% to 60%, the memory controller 120 may control such that the total sum TOT_DIE_NUM of the size of the super memory blocks is less than or equal to the threshold size of 60.

If the charging capacity of the capacitor is in a range of 60% to 80%, the memory controller 120 may control such that the total sum TOT_DIE_NUM of the size of the super memory blocks is less than or equal to the threshold size of 80.

If the charging capacity of the capacitor is in a range of 80% to 100%, the memory controller 120 may control such that the total sum TOT_DIE_NUM of the size of the super memory blocks is less than or equal to the threshold size of 100.

Although FIG. 11 illustrates examples of the threshold size values and charging capacity ranges, the memory controller 120 may variously configure the threshold size values and charging capacity ranges.

Hereinafter, a scenario will be described wherein the memory system 100 determines the size of super memory blocks corresponding to respective streams according to the number of streams as described with reference to FIG. 5 to FIG. 11.

It will be assumed in the scenario that the memory system 100 can generate a maximum of eight streams. It will also be assumed that the memory device 110 of the memory system 100 includes 32 memory dies. It will also be assumed that the power supply device 130 of the memory system 100 can supply emergency power such that a write operation can be normally performed with regard to a maximum of 128 memory dies when SPO occurs.

The memory controller 120 of the memory system 100 may initially generate a first stream STRM_1 in order to process a command from the host. The size of the super memory block corresponding to the first stream STRM_1 is 32, which is the maximum value. The number of simultaneously accessed memory dies in this case is 32.

The memory controller 120 may additionally generate a second stream STRM_2. The size of the super memory block corresponding to the second stream STRM_2 is also 32, which is the maximum value. The number of simultaneously accessed memory dies in this case is 32+32=64.

The memory controller 120 may additionally generate a third stream STRM_3. The size of the super memory block corresponding to the third stream STRM_3 is 24, which is less than the maximum value (32). The number of simultaneously accessed memory dies in this case is 32+32+24=88.

The memory controller 120 may additionally generate a fourth stream STRM_4. The size of the super memory block corresponding to the fourth stream STRM_4 is 16, which is less than the size (24) of the super memory block corresponding to the third stream STRM_3. The number of simultaneously accessed memory dies in this case is 32+32+24+16=104.

The memory controller 120 may additionally generate streams in the above-mentioned manner while conducting control such that the number of streams is less than or equal to 8.

In addition, the memory controller 120 may control such that the number of simultaneously accessed memory dies is less than or equal to the maximum value (128) of the number of memory dies to which the power supply device can supply emergency power during SPO.

Figure 12:
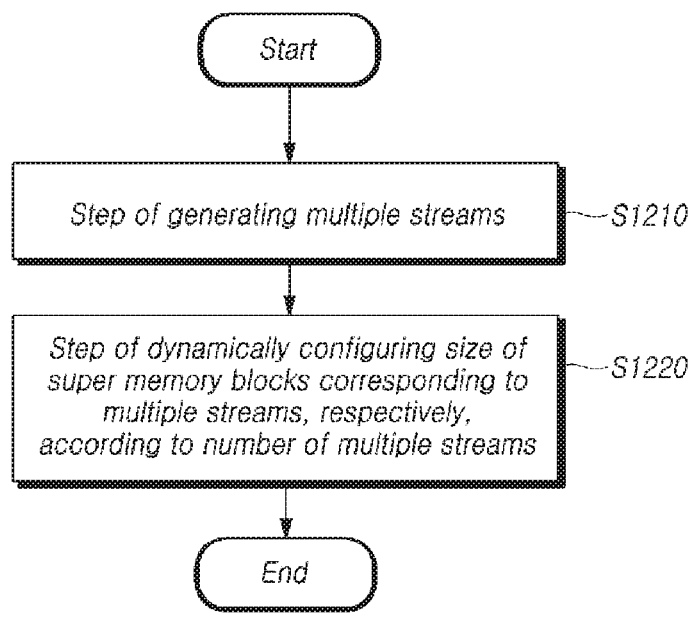
FIG. 12 is a flowchart illustrating a method for operating a memory controller according to embodiments of the present disclosure.

FIG. 12 is a flowchart illustrating a method for operating a memory controller 120 according to embodiments of the present disclosure.

Referring to FIG. 12, the method for operating the memory controller 120 may include a step (S1210) of generating multiple steams for processing a command from a host HOST.

The method may include a step (S1220) of dynamically configuring super memory blocks corresponding to the multiple streams generated in step S1210, respectively.

The memory controller 120 may control the memory device 110. The memory device 110 may include multiple memory blocks and may include multiple memory dies including some of the multiple memory blocks.

The super memory blocks may include at least one of the multiple memory blocks in the memory device 110.

The above-mentioned operations of the memory controller 120 may be controlled by the control circuit 123, and may be performed in such a manner that the processor 124 executes (or drives) firmware in which the overall operation of the memory controller 120 is programmed.

Figure 13:
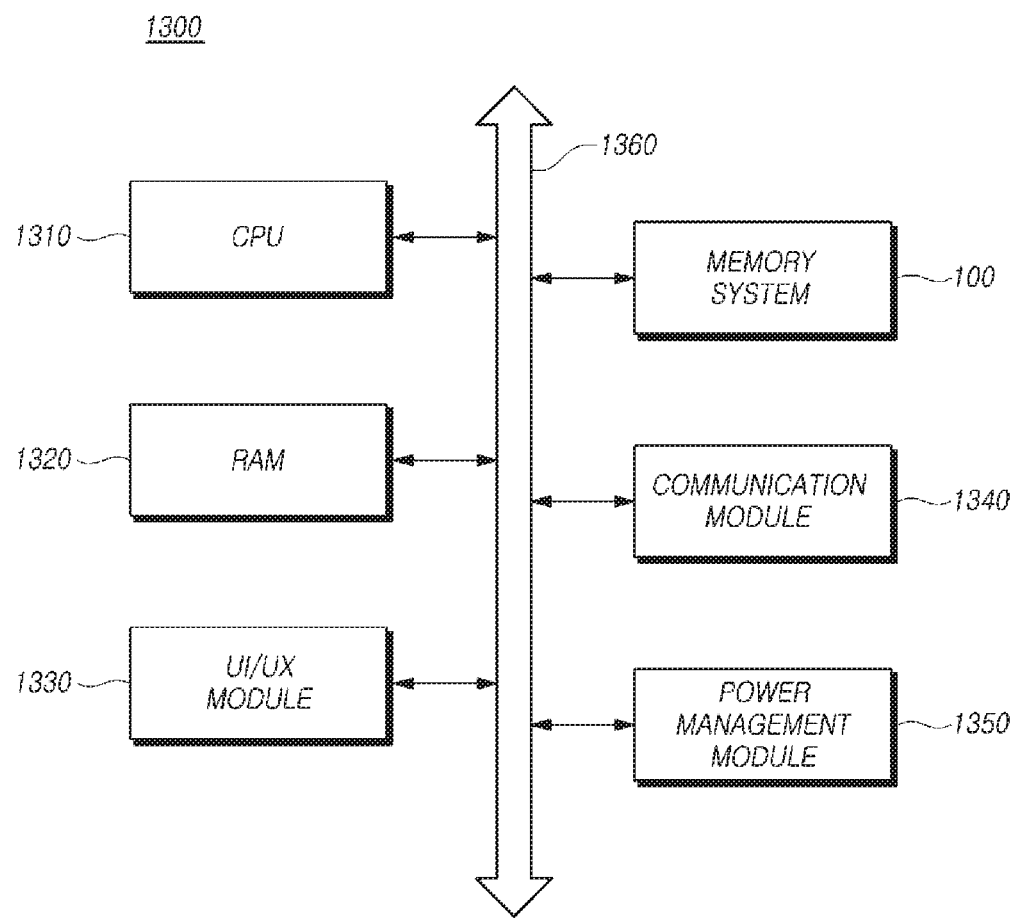
FIG. 13 is a diagram illustrating a computing system according to embodiments of the present disclosure.

FIG. 13 is a diagram illustrating a computing system 1300 according to embodiments of the present disclosure.

Referring to FIG. 13, the computing system 1300 may include: a memory system 100 electrically connected to a system bus 1360; a central processing unit (CPU) 1310 configured to control the overall operation of the computing system 1300; a random access memory (RAM) 1320 configured to store data and information related to operations of the computing system 1300; a user interface/user experience (UI/UX) module 1330 configured to provide the user with a user environment; a communication module 1340 configured to communicate with an external device in a wired and/or wireless type; and a power management module 1350 configured to manage power used by the computing system 1300.

The computing system 1300 may be a personal computer (PC) or may include a mobile terminal such as a smartphone or a tablet or various electronic devices.

The computing system 1300 may further include a battery for supplying an operating voltage, and may further include an application chipset, a graphic-related module, a camera image processor (CIS) and a dynamic random access memory (DRAM). Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM) and a ferroelectric RAM (FRAM). In addition, the memory system 100 may be implemented as storage devices in various types and mounted inside various electronic devices.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system comprising:
a memory device comprising multiple memory blocks and comprising multiple memory dies comprising a part of the multiple memory blocks; and
a memory controller configured to control the memory device,
wherein the memory controller is configured to receive a command from a host, generate multiple streams corresponding to the command, and dynamically configure the size of super memory blocks according to the number of multiple streams, each of the super memory blocks which corresponds to one of the multiple streams, and comprises at least one of the multiple memory blocks.

2. The memory system of claim 1, wherein the memory controller is configured to control such that the number of multiple streams is less than or equal to a threshold stream number.

3. The memory system of claim 1, wherein the memory controller is configured to control such that the size of each of the super memory blocks corresponding to the multiple streams decreases as the number of multiple streams increases.

4. The memory system of claim 1, wherein the memory controller is configured to control such that the size of a super memory block corresponding to a first stream among the multiple streams is greater than or equal to the size of a super memory block corresponding to a second stream, which is generated after the first stream among the multiple streams.

5. The memory system of claim 1, wherein the memory system further comprises a power supply device configured to supply emergency power to the memory controller when sudden power off (SPO) occurs, and the power supply device comprises a capacitor configured to accumulate an electric charge in order to supply the emergency power.

6. The memory system of claim 5, wherein the memory controller is configured to control such that the total sum of the size of each of the super memory blocks is less than or equal to a threshold size determined on the basis of a charging capacity of the capacitor.

7. The memory system of claim 1, wherein the size of each of the super memory blocks is determined according to the number of memory dies comprising at least one of memory blocks in each of the super memory block.

8. A memory controller comprising:
a memory interface configured to communicate with a memory device comprising multiple memory blocks and comprising multiple memory dies comprising a part of the multiple memory blocks; and
a control circuit configured to control the memory device,
wherein the control circuit is configured to receive a command from a host, generate multiple streams corresponding to the command, and dynamically configure the size of super memory blocks according to the number of multiple streams, each of the super memory blocks which corresponds to one of the multiple streams, and comprises at least one of the multiple memory blocks.

9. The memory controller of claim 8, wherein the control circuit is configured to control such that the number of multiple streams is less than or equal to a threshold stream number.

10. The memory controller of claim 8, wherein the control circuit is configured to control such that the size of each of the super memory blocks corresponding to the multiple streams decreases as the number of multiple streams increases.

11. The memory controller of claim 8, wherein the control circuit is configured to control such that the size of a super memory block corresponding to a first stream among the multiple streams is greater than or equal to the size of a super memory block corresponding to a second stream, which is generated after the first stream among the multiple streams.

12. The memory controller of claim 8, wherein emergency power is supplied from a power supply device when sudden power off (SPO) occurs, and the power supply device comprises a capacitor configured to accumulate an electric charge in order to supply the emergency power.

13. The memory controller of claim 12, wherein the control circuit is configured to control such that the total sum of the size of each of the super memory blocks is less than or equal to a threshold size determined on the basis of a charging capacity of the capacitor.

14. The memory controller of claim 8, wherein the size of each of the super memory blocks is determined according to the number of memory dies comprising at least one of memory blocks in the super memory block.

15. A method for operating a memory controller configured to control a memory device, the method comprising:
generating multiple streams corresponding to a command from a host; and
dynamically configuring the size of super memory blocks according to the number of multiple streams, each of the super memory blocks corresponding to one of the multiple streams,
wherein the memory device comprises multiple memory blocks and comprises multiple memory dies comprising a part of the multiple memory blocks, and
the super memory blocks comprise at least one of the multiple memory blocks.

16. A memory system comprising:
a memory device including a plurality of dies, each of the plurality of dies including multiple blocks; and
a controller coupled to the plurality of dies, suitable for:
receiving a command from a host;
generating multiple streams corresponding to the command; and
configuring super memory blocks based on the number of multiple streams, each of the super memory blocks corresponding to one of the multiple streams and including blocks selected from among the plurality of dies,
wherein the number of the selected blocks in each of the super memory blocks and the number of the plurality of dies including the selected blocks decrease as the number of the multiple streams increases.

\* \* \* \* \*